July 9, 1940.　　　　J. A. ZUBLIN　　　　2,207,188
DRILL BIT
Filed Jan. 23, 1939
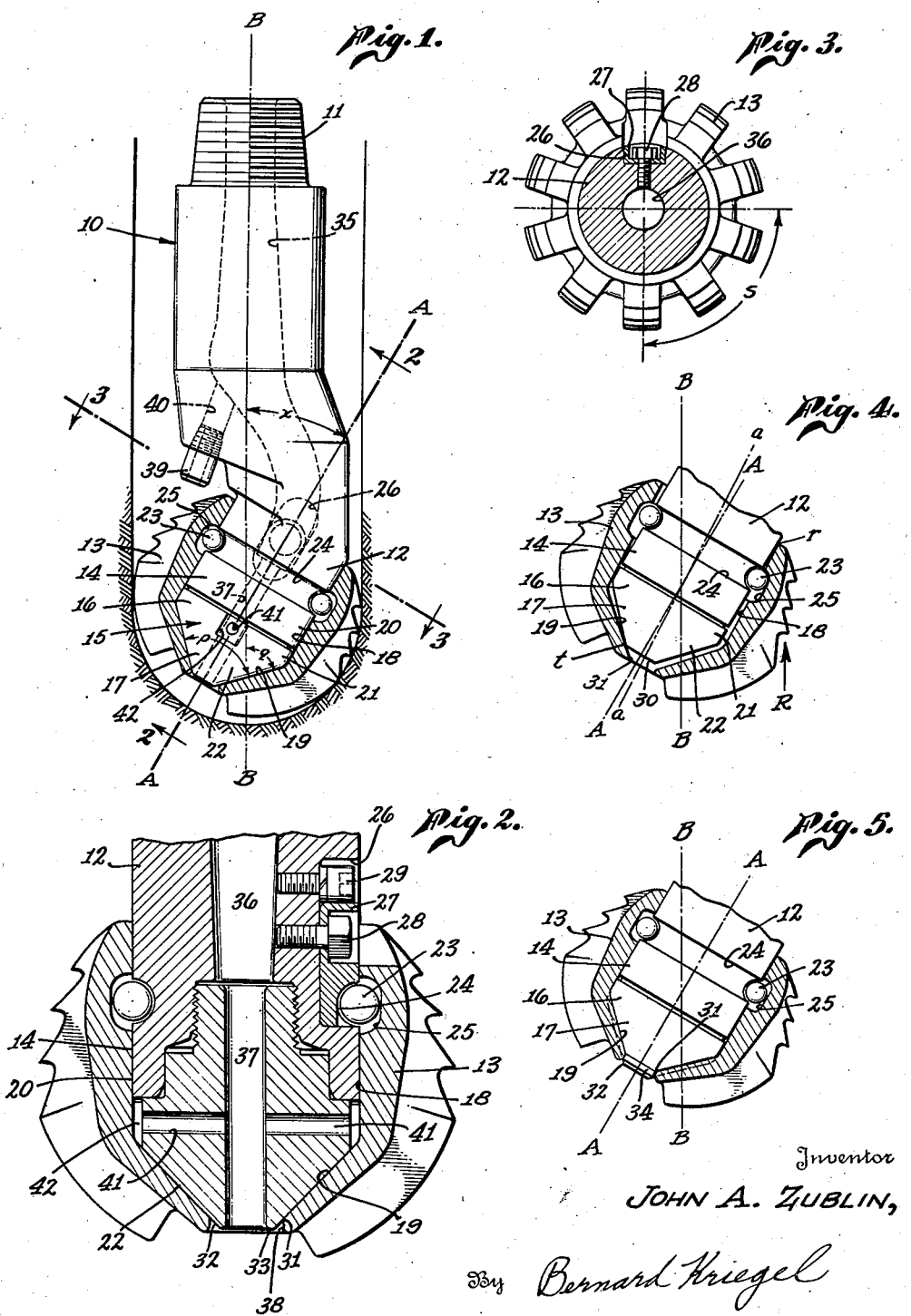
Inventor
JOHN A. ZUBLIN,
By Bernard Kriegel
Attorney Patented July 9, 1940

2,207,188

UNITED STATES PATENT OFFICE 2,207,188

DRILL BIT

John A. Zublin, Los Angeles, Calif.

Application January 23, 1939, Serial No. 252,383

4 Claims. (Cl. 255—71)

This invention relates to drill bits, being particularly concerned with the cooperation between a drill bit bearing and a cutter rotatably mounted thereon. More specifically, the present invention is an improvement on the drill bit described in the patent of John A. Zublin, No. 2,025,259, granted December 24, 1935.

In the patent referred to, the cutter is mounted on a shank bearing to rotate about an axis inclined with respect to the axis of the bit. The cooperable bearing surfaces on the cutter and shank include a cylindrical portion designed to transmit radial loads, and a terminal frusto-conical portion designed to transmit substantially the entire axial thrust and also to center the cutter with respect to the shank. Under many conditions of operation, proper bearing relationship between the cutter and shank bearing is maintained, with the cutter in contact with large peripheral areas on both the cylindrical and frusto-conical surfaces of the shank bearing. These large contact areas result in low unit bearing pressures and a consequent long life of the bearing surfaces on both the shank and cutter. But under some conditions of operation, the cutter tends to tilt or cock with respect to the shank bearing surfaces and their inclined axis, altering the bearing cooperation between the cutter and shank from one in which large surfaces are in contact to one in which only point or relatively small areas are in contact. The latter condition is attended with high unit bearing pressures and a consequent short useful life of the bearing surfaces on both the shank and cutter.

Accordingly, it is an object of the present invention to minimize or eliminate the tendency of a roller cutter to tilt or cock on its supporting bearing, thereby maintaining large areas of the bearing surfaces in contact, and effecting an increase in the useful life of the bit as a whole.

Another object of the invention is to provide a drill bit for oil wells and the like having a bearing construction serving to center the cutter on the bit shank, and in which the cutter is held centered on the shank by its production, while in operation, of an additional generally radial bearing surface on the shank bearing.

A further object of the invention is to provide improved means for lubricating the bearings of drill bits.

This invention posessess many other advantages and has other objects that will become apparent from a consideration of an embodiment of the invention. For this purpose, a form is shown in the drawing accompanying and forming part of the present specification, which embodiment will now be described in detail, illustrating the general principles of the invention. However, it is to be understood that this detailed description is not to be taken in a limited sense, since the scope of the invention is best defined by the appended claims.

Referring to the drawing:

Figure 1 is a side elevation of a drill bit;

Figure 2 is a section, on an enlarged scale, taken along the plane 2—2 of Figure 1;

Figure 3 is a transverse section taken along the plane 3—3 of Figure 1;

Figure 4 is a diagrammatic view showing the manner in which a cutter tends to tilt or cock on its bearing; and Figure 5 is a diagrammatic view disclosing the manner in which the cutter and shank bearings of the present invention cooperate with one another to resist the tilting or cocking of the cutter.

In Figure 1, a completely assembled bit is disclosed including a shank 10 having a tapered threaded pin 11 at its upper end for attaching the bit to a string of drill pipe (not shown). The bottom of the shank terminates in a bearing 12 for a cutter whose axis A—A is inclined to the shank axis B—B by an angle $x$. A cutter 13 is mounted on the bearing for rotation about the axis A—A, and comprises a bowl-shaped body, the internal surfaces of which are complementary to the outer faces of the shank bearing. The lower end of the shank is finished to form a cylindrical portion 14 of generally uniform diameter. This cylindrical portion threadedly receives a thrust cone or pin 15, whose outer surface includes a cylindrical portion 16 of substantially the same diameter as the cylindrical portion on the shank and a terminal, downwardly disposed frusto-conical portion 17. Despite the fact that the bearing for the cutter is made of two physically separable members, it is essentially a single unitary bearing having a cylindrical surface merging or continuing into a frusto-conical portion. As a large part of the bearing wear occurs on the thrust cone surfaces, it is preferred to make the cone or pin 15 removable from the remainder of the shank, although it is to be understood that the complete bearing could be made in one piece, if desired.

As aforementioned, the internal bearing surfaces 18, 19 on the bowl-shaped cutter are complementary and engageable with the corresponding cylindrical and frusto-conical surfaces 20, 21, 22 on the shank and its thrust cone. This cutter is held against removal from the shank by a plurality of balls or other bodies 23 rollable in a peripheral groove 24 formed in the shank bearing, and also within a peripheral groove or recess 25 formed in the interior of the bowl-shaped cutter. These balls 23 are preferably somewhat less in diameter than the total radial distance across the ball channels 24, 25 so that the balls do not act as bearings, the cutter receiving its support directly from the shank and its thrust cone or pin. It is to be understood, however, that these balls, or their equivalent, could also function as anti-friction bearing members, if desired.

The balls are introduced into the peripheral grooves 24, 25 through a longitudinally extending recess 26 provided in the cylindrical bearing portion of the shank above its peripheral groove. After a sufficient number of the balls have been thus introduced, they are held in place by a suitable locking plug 27 fitting within the longitudinal recess and held there by means of a suitable lock screw 28 and an additional safety screw 29. Further details of the locking device can be found in Patent No. 2,025,259, above referred to.

The apex angle $p$ of the frusto-conical thrust pin 15 is preferably such with respect to the extent of inclination of the axis A—A to the axis B—B that the lowermost cone surface makes an acute angle $q$ with the shank axis B—B. Because of this arrangement, the cutter tends to be self-centered on the frusto-conical bearing in view of longitudinal components of thrust between the formation and the cutter having a component tending to slide the cutter upwardly on its supporting bearing. Under many conditions of operation, this self-centering action provides a large surface of bearing contact between the frusto-conical portions of both the pin 15 and cutter 13. This is true of the arrangement disclosed in Patent No. 2,025,259. However, in the device disclosed in the patent, the small bases 30, 31 of the cone frustums on both the pin and the cutter terminate in substantially the same plane at right angles to the axis A—A. As represented in Figure 4, this allows longitudinal thrust R of the formation against the reaming teeth on the cutter to tilt or cock the cutter, tending to change its rotational axis from the position A—A to one $a$—$a$ making a smaller angle of inclination with the shank axis B—B. As a result, surface bearing contact is lost between the cutter and the cylindrical and frusto-conical portions of the shank. Localized wear then occurs on the cylindrical shank bearing portion $r$ above the peripheral ball groove 24, primarily in the quadrant region designated by the angle $s$ in Figure 3. Substantially diagonally opposite this region of localized wear, tilting of the cutter moves its frusto-conical surface 19 over the smaller frusto-conical base 30 of the pin (see Figure 4). Substantially point bearing contact $t$, instead of the desirable surface bearing contact, occurs between the smaller base portion of the pin 30 and the sides 19 of the cutter, producing exreme localized wear on the cone 15 and also tending to cut a groove upon the tapered cutter bearing surface as it rotates with respect to the shank. The extent of cone wear can be decreased somewhat by hardfacing its bearing surfaces. But this entails the disadvantage of increasing the extent of wear on the cone bearing surfaces 19 of the cutter. As these parts and the cylindrical shank parts $r$ in the quadrant region $s$ wear, the cutter can be tilted still further towards parallelism with the shank axis, aggravating the localized point bearing engagements $r$, $t$ between the cylindrical and conical surfaces on both the shank and cutter.

The present invention overcomes the tilting action of the cutter on its supporting bearing by preventing the cone bearing surface 19 on the cutter from sliding over the smaller end 30 of the pin, as in Figure 4. This objective is achieved by extending the cone portion 32 of the pin beyond the smaller base 31 of the cutter frustum. The degree of this extension need not be large, so long as the cutter is prevented from tilting over the smaller end 33 of the cone, by the engagement of its smaller base portion 31 with the tapered sides 22 of the pin. Under extreme conditions of operation, the terminal cutter portion 31 might tend to dig into the sides of the cone. This tendency can be offset by hardfacing the cone, but in the event that some deformation of the cone does occur upon upward movement of the cutter on its bearing, the result will be the production by the rotating cutter of a shoulder 34 at the lower end of the thrust cone (see Figure 5). The shoulder thus formed will operate in the manner of a radial bearing, tending to prevent tilting of the cutter towards parallelism with the shank axis, and consequently, offers assurance that surface bearing contact between the cutter and the inclined shank portions is maintained to a much greater extent than heretofore, the acute angle $q$ that the lowermost cone portion makes with the shank axis still tending to maintain the cutter centered upon the shank bearings.

The bit disclosed in the drawing is provided with the usual water course 35 in the shank communicating with passageways 36, 37 through the inclined shank pin and thrust cone, and through a lower hole 38 in the cutter to discharge drilling fluid against the bottom to remove cuttings therefrom. An additional water nozzle 39 is also threaded into a channel 40 communicating with the shank water course to direct a stream of fluid upon the cutter teeth. In addition, radial side holes 41 are provided in the thrust cone extending from the passageway 37 in the cone to side slots 42 opening upon the bearing surfaces thereon to permit passage of lubricating fluid to the bearing surfaces. The passage 37 through the cone is preferably cylindrical and of uniform dimensions throughout its entire length in order to eliminate all restrictions to the flow of fluid therethrough tending to build up back pressures. The side holes 41 through the cone are arranged at right angles to the cylindrical central cone water passage 37, so that any abrasive matter passing through the cone will be conveyed past the side holes in view of their relatively higher density and kinetic energy, permitting only clean drilling fluid to flow through the side holes to the bearing surfaces. If any restrictions were present in the central cone channel 37, a back pressure would be built up, forcing the abrasive matter through the side holes 41. Moreover, if the side holes extended downwardly and outwardly from the central water passage, rather than being at right angles thereto, or extending upwardly and outwardly therefrom, the abrasive laden fluid could still enter the holes for conveyance to the bearing surfaces. But the fact that the side holes are not arranged downwardly and outwardly causes the abrasive matter to flow past their entrance openings.

I claim:

1. In a drill bit, a shank having a bearing, a bearing pin threaded into said shank bearing, a fluid passageway in the shank communicating with aligned channels in said shank bearing and bearing pin, the channel in said bearing pin being free from restrictions and having an exit opening at its lower end, said pin being provided with a hole at right angles to the axis of its channel which establishes communication between the pin channel and its bearing surfaces, and a cutter rotatably mounted on said pin and shank bearing.

2. In a drill bit, a shank having a cylindrical bearing, a bearing pin threaded into said bearing and having a cylindrical bearing surface adjacent said cylindrical bearing and a conical surface, a fluid passageway in the shank communicating with aligned channels in said shank bearing and bearing pin, the channel in said bearing pin being free from restrictions and having an exit opening at its lower end, said pin being provided with a hole substantially at right angles to the axis of its channel establishing communication between the pin channel and its cylindrical bearing surface, and a cutter rotatably mounted on said pin and shank bearing.

3. In a drill bit, a shank having a cylindrical bearing threadedly receiving a bearing pin having a cylindrical bearing surface adjacent said cylindrical bearing and a conical surface, a fluid passageway in the shank communicating with passages in said shank bearing and bearing pin, the pin passage being free from restrictions and having an exit opening at its lower end, a slot in the side of said pin, said pin being provided with a hole substantially at right angles to the axis of its passage establishing communication between the pin passage and slot, and a cutter rotatably mounted on said pin and shank bearing.

4. In a drill bit, a shank threadedly receiving a removable bearing pin, a cutter rotatably mounted on said pin, a fluid passageway in said shank communicating with a passage through said pin having an exit opening at its lower end, the pin passage being free from restrictions, said pin having a slot in its bearing sides, and said pin being provided with a hole substantially at right angles to its passage establishing communication between the pin passage and slot.

JOHN A. ZUBLIN.